US008712973B2

(12) United States Patent
Ramachandran

(10) Patent No.: US 8,712,973 B2
(45) Date of Patent: Apr. 29, 2014

(54) WEIGHTED DETERMINATION IN CONFIGURATION MANAGEMENT SYSTEMS

(75) Inventor: Puthukode G. Ramachandran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1182 days.

(21) Appl. No.: 11/279,299

(22) Filed: Apr. 11, 2006

(65) Prior Publication Data

US 2007/0239700 A1 Oct. 11, 2007

(51) Int. Cl.
*G06F 7/00* (2006.01)
*G06F 17/00* (2006.01)

(52) U.S. Cl.
USPC .......................................... 707/691; 714/25

(58) Field of Classification Search
None
See application file for complete search history.

(56) References Cited

U.S. PATENT DOCUMENTS

| | | | | |
|---|---|---|---|---|
| 5,099,412 | A * | 3/1992 | Kelley | 700/28 |
| 5,535,335 | A * | 7/1996 | Cox et al. | 709/221 |
| 5,565,316 | A * | 10/1996 | Kershaw et al. | 434/322 |
| 5,627,766 | A * | 5/1997 | Beaven | 702/122 |
| 5,758,071 | A * | 5/1998 | Burgess et al. | 709/220 |
| 5,914,879 | A * | 6/1999 | Wang et al. | 700/111 |
| 6,098,098 | A * | 8/2000 | Sandahl et al. | 709/221 |
| 6,128,730 | A | 10/2000 | Levine | |
| 6,170,065 | B1 * | 1/2001 | Kobata et al. | 714/7 |
| 6,252,858 | B1 * | 6/2001 | Inoue | 370/254 |
| 6,279,125 | B1 * | 8/2001 | Klein | 714/38 |
| 6,289,368 | B1 * | 9/2001 | Dentler et al. | 718/101 |
| 6,295,540 | B1 | 9/2001 | Sanschagrin | |
| 6,385,770 | B1 | 5/2002 | Sinander | |
| 6,671,871 | B2 * | 12/2003 | Utsumi | 717/101 |
| 6,691,067 | B1 * | 2/2004 | Ding et al. | 702/186 |
| 6,704,737 | B1 | 3/2004 | Nixon et al. | |
| 6,826,715 | B1 * | 11/2004 | Meyer et al. | 714/37 |
| 6,832,346 | B2 | 12/2004 | Cross | |
| 6,836,750 | B2 * | 12/2004 | Wong et al. | 702/186 |

(Continued)

FOREIGN PATENT DOCUMENTS

WO 0153948 A 7/2001

OTHER PUBLICATIONS

Carl W. Symborski, Updating software and configuration data in a distributed communications network, IEEE 1988.*

(Continued)

*Primary Examiner* — Augustine K Obisesan
(74) *Attorney, Agent, or Firm* — Robert H. Frantz; Jeffrey S. LaBaw; John D. Flynn

(57) ABSTRACT

A system, method, and medium for providing configurable item configuration data by receiving a plurality of configuration data sets from a plurality of sources, all which pertain to the same configurable item (CI), then using weighting rules and preferences to assign weight values for each option, feature, and component in each report according to discrepancies and commonalities between the data sets, creating a new data set for the configurable item by selecting options, features, and components having the greatest weight values among all of the data sets, assigning confidence factors to each option, feature, and component by weight comparisons between the plurality of data sets; updating a configuration management database entry for the configurable item accordingly. The confidence factors are useful for inhibiting regulated processes, such as software release processes and change control processes, and for generating human-readable configuration reports indicating confidence levels of the reports and their contents.

33 Claims, 15 Drawing Sheets

(56) References Cited

U.S. PATENT DOCUMENTS

| | | | |
|---|---|---|---|
| 6,912,534 B2* | 6/2005 | DeBettencourt et al. | 1/1 |
| 6,968,540 B2 | 11/2005 | Beck et al. | |
| 7,113,883 B1* | 9/2006 | House et al. | 702/122 |
| 7,233,935 B1* | 6/2007 | Chandler | 706/47 |
| 7,747,987 B1 | 6/2010 | Akarte et al. | |
| 7,913,227 B2 | 3/2011 | Aikens et al. | |
| 7,926,031 B2 | 4/2011 | Faihe et al. | |
| 2002/0133541 A1 | 9/2002 | Sturtevant et al. | |
| 2002/0184247 A1 | 12/2002 | Jokela et al. | |
| 2002/0199194 A1 | 12/2002 | Ali | |
| 2003/0018451 A1 | 1/2003 | Sullivan | |
| 2003/0051191 A1* | 3/2003 | Circenis et al. | 714/25 |
| 2003/0061132 A1 | 3/2003 | Yu et al. | |
| 2003/0130887 A1 | 7/2003 | Nathaniel | |
| 2003/0144810 A1* | 7/2003 | Tabor | 702/108 |
| 2003/0204781 A1* | 10/2003 | Peebles et al. | 714/25 |
| 2003/0204791 A1* | 10/2003 | Helgren et al. | 714/48 |
| 2004/0002799 A1* | 1/2004 | Dabbish et al. | 701/35 |
| 2004/0002880 A1 | 1/2004 | Jones | |
| 2004/0039646 A1* | 2/2004 | Hacker | 705/22 |
| 2004/0039917 A1 | 2/2004 | Ross | |
| 2004/0045001 A1* | 3/2004 | Bryant | 718/100 |
| 2004/0088314 A1* | 5/2004 | Simes | 707/102 |
| 2004/0133792 A1* | 7/2004 | Dublish et al. | 713/193 |
| 2004/0143600 A1 | 7/2004 | Musgrove et al. | |
| 2004/0162887 A1 | 8/2004 | Dillon et al. | |
| 2004/0220782 A1 | 11/2004 | Cook | |
| 2004/0260920 A1* | 12/2004 | Arnfield et al. | 713/100 |
| 2004/0267477 A1* | 12/2004 | Scott et al. | 702/108 |
| 2005/0015388 A1 | 1/2005 | Dasgupta et al. | |
| 2005/0065839 A1 | 3/2005 | Benson et al. | |
| 2005/0071838 A1 | 3/2005 | Hatasaki | |
| 2005/0080811 A1 | 4/2005 | Speeter et al. | |
| 2005/0097150 A1 | 5/2005 | McKeon et al. | |
| 2005/0097547 A1 | 5/2005 | Ramachandran | |
| 2005/0144022 A1 | 6/2005 | Evans | |
| 2005/0210048 A1 | 9/2005 | Beres et al. | |
| 2005/0262065 A1* | 11/2005 | Barth et al. | 707/3 |
| 2006/0004875 A1 | 1/2006 | Baron et al. | |
| 2006/0025962 A1* | 2/2006 | Ma et al. | 702/182 |
| 2006/0031371 A1 | 2/2006 | Uthe | |
| 2006/0101095 A1* | 5/2006 | Episale et al. | 707/204 |
| 2006/0101421 A1 | 5/2006 | Bodden et al. | |
| 2006/0143144 A1* | 6/2006 | Speeter et al. | 706/47 |
| 2006/0149501 A1 | 7/2006 | Tsalakopoulos | |
| 2006/0161879 A1 | 7/2006 | Lubrecht et al. | |
| 2006/0200494 A1* | 9/2006 | Sparks | 707/104.1 |
| 2006/0253554 A1* | 11/2006 | Uwais | 709/220 |
| 2007/0100892 A1* | 5/2007 | Kephart et al. | 707/200 |
| 2007/0203952 A1 | 8/2007 | Baron et al. | |
| 2007/0234331 A1 | 10/2007 | Schow | |
| 2007/0239700 A1 | 10/2007 | Ramachandran | |
| 2008/0140778 A1 | 6/2008 | Banavar et al. | |
| 2008/0183690 A1 | 7/2008 | Ramachandran | |
| 2009/0012997 A1 | 1/2009 | Rajaraman et al. | |
| 2009/0019046 A1 | 1/2009 | Coley et al. | |
| 2009/0248596 A1 | 10/2009 | Matsumoto et al. | |
| 2010/0095273 A1 | 4/2010 | Matthiesen | |
| 2010/0185658 A1 | 7/2010 | Kowalski | |
| 2011/0239191 A1 | 9/2011 | Ramachandran | |

OTHER PUBLICATIONS

Soo Dong Kim and Soo Ho Chang, A systematic method to identify software components, Proceedings of the 11th Asia-Paciific Software engineering conference, IEEE 2004.*

Hans Schuster, Jens Neeb, and Ralf Schamburger, A configuration management approach for large workflow management systems, ACM 1999.*

Bharat Bhushan and Ahmed Patel, Requirement and the concept of cooperative system management, John Wiley $ Sons, Ltd. 1998.*

Volzer, at al.: A Tool for Subsystem Configuration Management, 2002 IEEE.

Bezencheck, et al, "A Data Structure for Representing Aggregate Data", 1996 IEEE.

Wikipedia, "Information Technology Infrastructure Library", downloaded on Mar. 21, 2006 from http://www.wikipedia.com.

USPTO; Examination Correspondence from a Related Abandoned Application, U.S. Appl. No. 11/627,398, filed Jan. 26, 2007 by Puthukode G. Ramachandran.

Canadian Intellectual Property Office; requisition from the Examiner in foreign counterpart application, CIPO application 2,640,430, mailed on May 9, 2013.

* cited by examiner

75

700
701

Example CF-Annotated Configuration Report for $PC_{13}$

<CI>PC, ID=13, CF7.5 </CI>
<chassis> rack-19, ver. 1.0, CF8 </chassis>

<mother> Pent4-AX9, rev. 3.3, CF8 </mother>

⋮

<app> MSWord, ver. 2005, patch 3, installed 12/15/2005, CF7 </app>

<app> NSNav,ver. 6.2, installed 12/18/2005, audited 12/19/2005, CF8 </app>

WEIGHTED DETERMINATION IN CONFIGURATION MANAGEMENT SYSTEMS

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

BACKGROUND OF THE INVENTION

1. Field of the Invention

This invention pertains to technologies for managing, tracking, and updating the configurations of configurable systems such as computers in an enterprise.

2. Background of the Invention

A Configuration Management Database ("CMDB") refers to a system which is used to track, monitor, and update the configuration or combination of components within a configurable system, such as a computer. Such configurable systems typically have a number of electronic components and options, such as motherboards, backplanes, add-in cards. They also often have a number of software components or options, such as operating systems, application programs, drivers, patches, upgrades, and the like. Finally, they typically have a number of hardware options, such as brackets, cases, housings, panels, cables, etc.

Information Technology Infrastructure Library ("ITIL") is a widely accepted approach to IT service management throughout the world, which is promulgated by the United Kingdom's Office of Governance Commerce ("OGC"). ITIL employs a process-model view of controlling and managing operations. OGC works closely with public sector companies and organizations to improve a cohesive set of best practice approaches in commercial activities. ITIL's customizable framework of practices includes, but is not limited to, provisioning of information technology ("IT") service quality, essential accommodation and facilities required supporting a proposed technology services, or the structures necessary for meeting business demands and improving IT services. As such, ITIL aims to benefit the IT community by providing both a comprehensive information that is readily accessible and creating a common vocabulary which facilitate communication across industries. CMDB is a term adopted by ITIL, and used throughout the IT profession to refer to a general class of tools and processes which are used or followed to manage the configurations of configurable systems, which are referred to as Configuration Items ("CI") in ITIL terms.

According to ITIL recommendations or requirements, a CMDB is supposed to contain the latest information on all CIs for which it is applied. The CMDB data is supposed to be accurate in any given environment. In some cases the CMDB cannot be kept in synchronization with the real world systems management environment since there are multiple point products involved in creating the relationships and the CIs. For example, some systems may update themselves, such as self-updating software applications, without updating or notifying the CMDB of the changes. In another example, a component of a CI may be removed, replaced, installed, or upgraded by a system administrator without updating or notifying the CMDB of the changes. As such, many CMDB records regarding particular configurable systems are only partially correct, although it is difficult to determine which details are correct and which are incorrect.

Further, many enterprises employ a number of technologies and products within the enterprise, and often configuration information is managed by more than one CMDB tool. This occurs sometimes unintentionally, as legacy systems are grafted together, and as new products for other vendors are integrated into legacy environments.

Thus, even when strict configuration change processes are followed, often records in separate CMDB systems regarding the same CI may not be in agreement, may be partially inaccurate, and may be incompatible with being synchronized with each other.

BRIEF DESCRIPTION OF THE DRAWINGS

The following detailed description when taken in conjunction with the figures presented herein provide a complete disclosure of the invention.

FIG. 7b provides an example of a CMDB CI record set enhanced to include a confidence factor for each item, and optionally an overall confidence factor for the entire configurable item.

SUMMARY OF THE INVENTION

Figure 1:
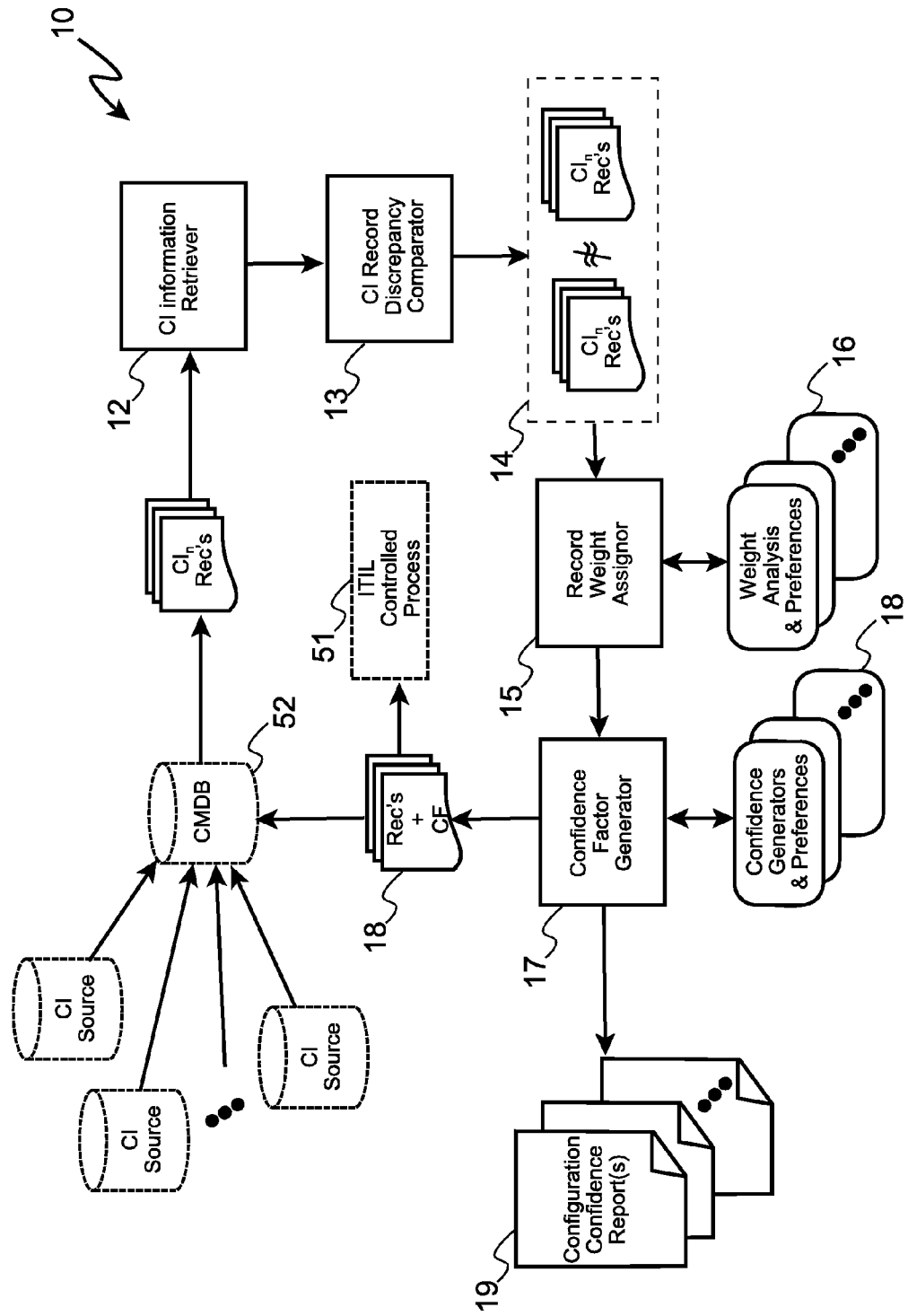
FIG. 1 depicts a general system arrangement of components and devices according to the present invention.

The present invention provides, in various embodiments, a system, a method, or a computer-readable medium for providing configurable item configuration data by receiving a plurality of configuration data sets from a plurality of sources, all which pertain to the same configurable item (CI), then using weighting rules and preferences to assign weight values for each option, feature, and component in each report according to discrepancies and commonalities between the data sets, creating a new data set for the configurable item by selecting options, features, and components having the greatest weight values among all of the data sets, assigning confidence factors to each option, feature, and component by weight comparisons between the plurality of data sets; updating a configuration management database entry for the configurable item accordingly. The confidence factors are useful for inhibiting regulated processes, such as software release processes and change control processes, and for generating human-readable configuration reports indicating confidence levels of the reports and their contents. According to one aspect of the present invention, the reported confidence factors are provided in one or more reports useful for compliance with regulations put in place by a quality or configuration control organization.

DETAILED DESCRIPTION OF THE INVENTION

The inventors of the present invention have recognized a problem unaddressed in the art regarding managing configuration information for configurable systems in an environment where two or more configuration management tools are employed. For the convenience of the reader, throughout this disclosure, we will refer to such configurable systems, tools, and processes using ITIL terminology. However, it will be recognized by those skilled in the art that the present invention is not limited to applications which are ITIL compliant. Additionally, in this disclosure, the term "point product" will be used to describe any system which can be managed by a CMDB tool (e.g. a "target system"). For example, a point product may be used to distribute software applications, to monitor a software application, or to monitor a network health.

Based on these discoveries, the inventor has developed the following logical processes, systems, services, and computer-readable media to solve these unrecognized problems in the art.

A typical CMDB that is being populated from multiple sources (e.g. regarding or from multiple point products) cannot be kept in synchronization with all the point products in practice because it is difficult to keep data synchronization between several products and one or more CMDB tools up to date.

Generally speaking, the inventor has discovered that if a CMDB is created from multiple point products or data sources, chances are high that CMDB does not reflect the actual exact state of a CI and its relationships at any given moment.

For example, suppose a CMDB has CIs including hardware, software, monitoring applications, and the relationship between them stored in a CMDB from point products including Tivoli Provisioning Manager ("TPM"), Tivoli Configuration Manager ("TCM"), and IBM Tivoli Monitor ("ITM"), which are all well-known products and systems, and which are all used widely through enterprise computing. Other well known CIs include computing platforms such as servers, desktop computers, and client devices provided by companies like IBM™, Dell™, BEA Systems, Inc.™, and the Hewlett Packard Company™; network equipment such as products by Cisco™; and CMDB systems such as those sold by Computer Associates, Inc.™, BMC Software, Inc.™, and the Hewlett Packard Company™.

In such a scenario, chances are high that the CI configuration information is out of synchronization with reality since synchronizing such data real time between these products and CMDB is resource intensive. The relationship between the CIs may also be not accurate as reported by the point product.

Figure 5:
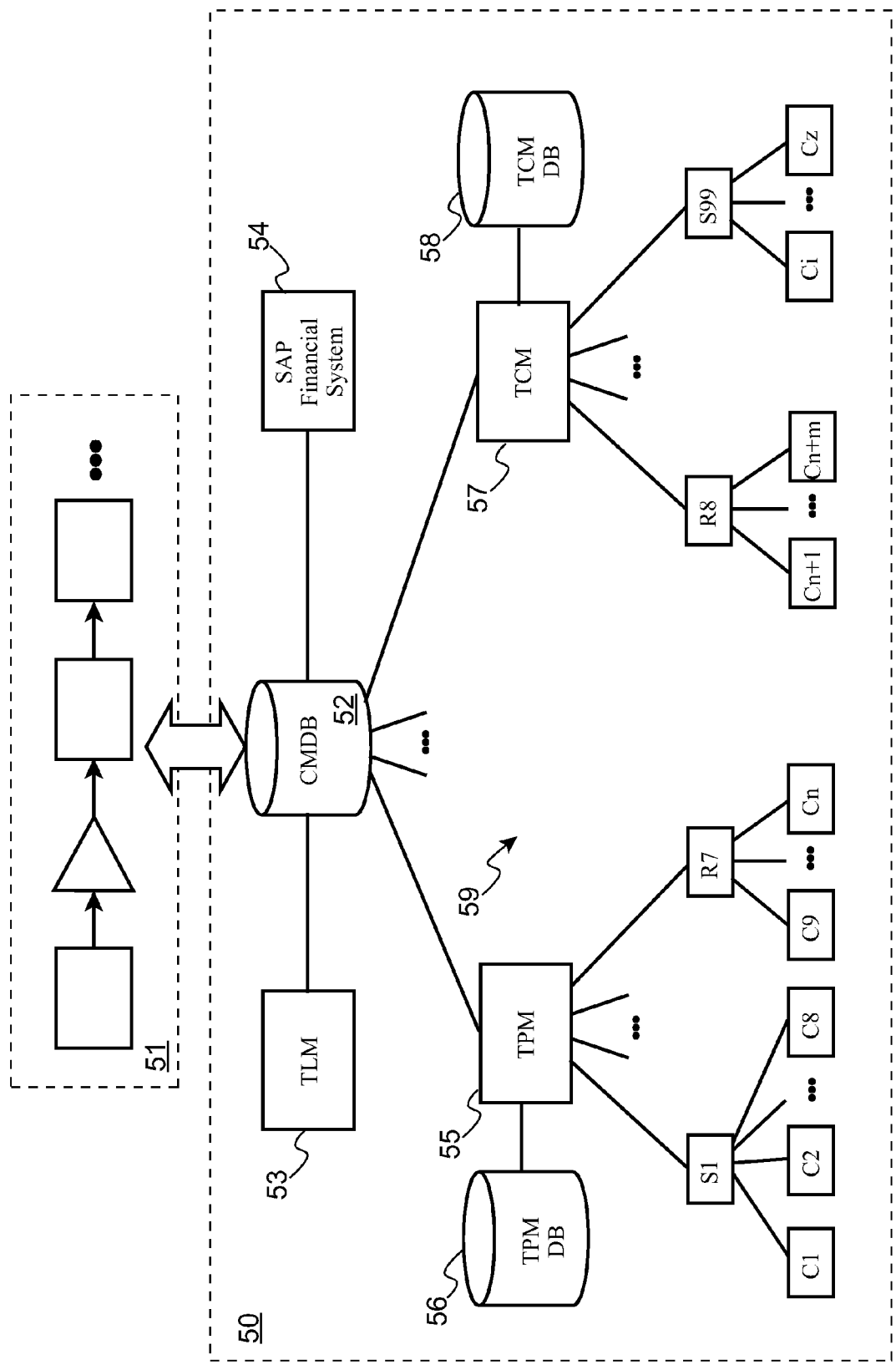
FIG. 5 illustrates a typical configuration management database arrangement of systems and components.

Such an example is illustrated in FIG. 5, in which a CMDB (52) tool is used to integrate and aggregate configuration information for a number of point products including a number of computers (C1, C2, ... Cz), switches (S1, ... S99), and routers (R7, R8, ... ), via a number of actors, such as a TPM (55) system and a TCM system (57), each of which have their own configuration database (56, 58, respectively). Also in this example, a Tivoli License Manager ("TLM") (53), and a non-IBM non-Tivoli financial system product (54), such as one from SAP, provide configuration information to the CMDB (52). A change management process (51), release management process, or other process is generally followed in order to attempt to manage the changes to the CIs (e.g. the point products, actors, integrated systems, etc.).

So, in summary, a CMDB system records the items, features, options, and components installed, enabled, or otherwise integrated into or cooperative with a Configurable Item, including their relationships to each other (e.g. router to PC, PC to mouse, etc.) within the CI and between CI's, typically using a "relationship registry" according to ITIL or other standards. Certain systems or components within the system may "act" upon an end point system (e.g. target machines, end points, point products), such as "pushing" a software installation onto it, but generally speaking, a CMDB is not an actor, it is just a collector of information.

Weight-Based Confidence Factor Generator System Overview

For the purposes of this disclosure, we will refer to the collection of things which can be configured in a CI, such as options, features, components, etc., as configurable elements of a CI. We will also refer to user- or administrator-selected logical operations, thresholds, priorities, and choices which are employed or considered by the various logical processes of the invention as rules and preferences. As described in further detail in the following paragraphs, each configurable element listed in each CI configuration report is assigned a weight based on its likelihood of being correct or complete, and these weights are then used to select or combine configurable elements from multiple CI configuration reports to generate a new configuration report for the CI. Optionally, confidence factors for each configurable element in the new report, as well as an overall, unit-level confidence factor, may be generated by analyzing the weights and range of differences (e.g. range of deviation) of weights among the reports. For example, if a configurable item of a hard drive is reported in three reports to be a 200 GB drive, while only one report shows that it is a 100 GB report, a high confidence factor for that configurable item would be in order. However, if all the reports are fairly disparate, such as one report indicates the hard drive is 100 GB, another report shows a 200 GB drive, while another shows the drive as being removed or disabled entirely, the confidence factor for this configurable element in the new report would be relatively low. Likewise, a unit-level confidence factor for an entire CI in which most or all of the configurable elements have high confidence factors would also be high, but a unit-level confidence factor for a CI in which some or many of the configurable elements have low confidence factors may also be low.

Turning to FIG. 1, an example arrangement (10) of systems, including the components of the invention, is shown.

The present invention resolves configuration discrepancies or disagreements between multiple configuration databases by assigning weights to the CIs based on one or more criteria, such as the number of times a CI has been read by other systems, the number of times a CI has been written or updated by other systems, the number of relationships a CI has in a CMDB, the frequency with which a CI has been read or written, and how recently a CI has been accessed or updated.

After a weight is assigned to CIs in the CMDB based on one or more criteria such as these, a confidence factor ("CF") is then determined for each CI. This confidence factor is then used to automatically decide which details of a CI are accurate or reliable, and the confidence factors are reported for review by a system administrator to assist in determining which conflicting details are to be relied upon in a decision.

For example, information regarding a CI are collected from multiple sources, such as TCM and TPM, via a CMDB system (52). The records (11) regarding a particular configurable item $CI_n$ are retrieved (12) by the invention, and compared for discrepancies (13), to find missing and nonequivalent details, features, or component records (14) regarding the configurable item $CI_n$. The details of the CI records are then weighted (15) using one or more weight analysis processes and preferences (16).

The weighted CI details are then analyzed to generate (17) a Confidence Factor ("CF") (17) for each feature or component in the CI, as well as optionally generating an overall CF for the entire CI as a unit, using one or more confidence generator processes and preferences (18).

Optionally, the invention produces one or more user reports (19) for review by a system administrator, including indications of the CF for each CI feature and component, as well as indicating the overall CF for the CI as a unit. Additionally, the invention updates the records for the configurable item in the CMDB to include the most reliable or trustworthy CI features and components, including the confidence factors (18).

Finally, these confidence factors are preferably employed in enhanced ITIL process controls (51), such as a release control process or a change management process. For example, the processes may be re-engineered to only allow upgrades to systems for which the CF of its configuration is 85% or higher.

According to a preferred embodiment, the entire process is executed upon command from a user, or on a periodic basis, such as a timed basis executed by a background daemon in a Unix environment, for example.

Weight Assignment Process and Annotation of CMDB Records

Figure 6A:
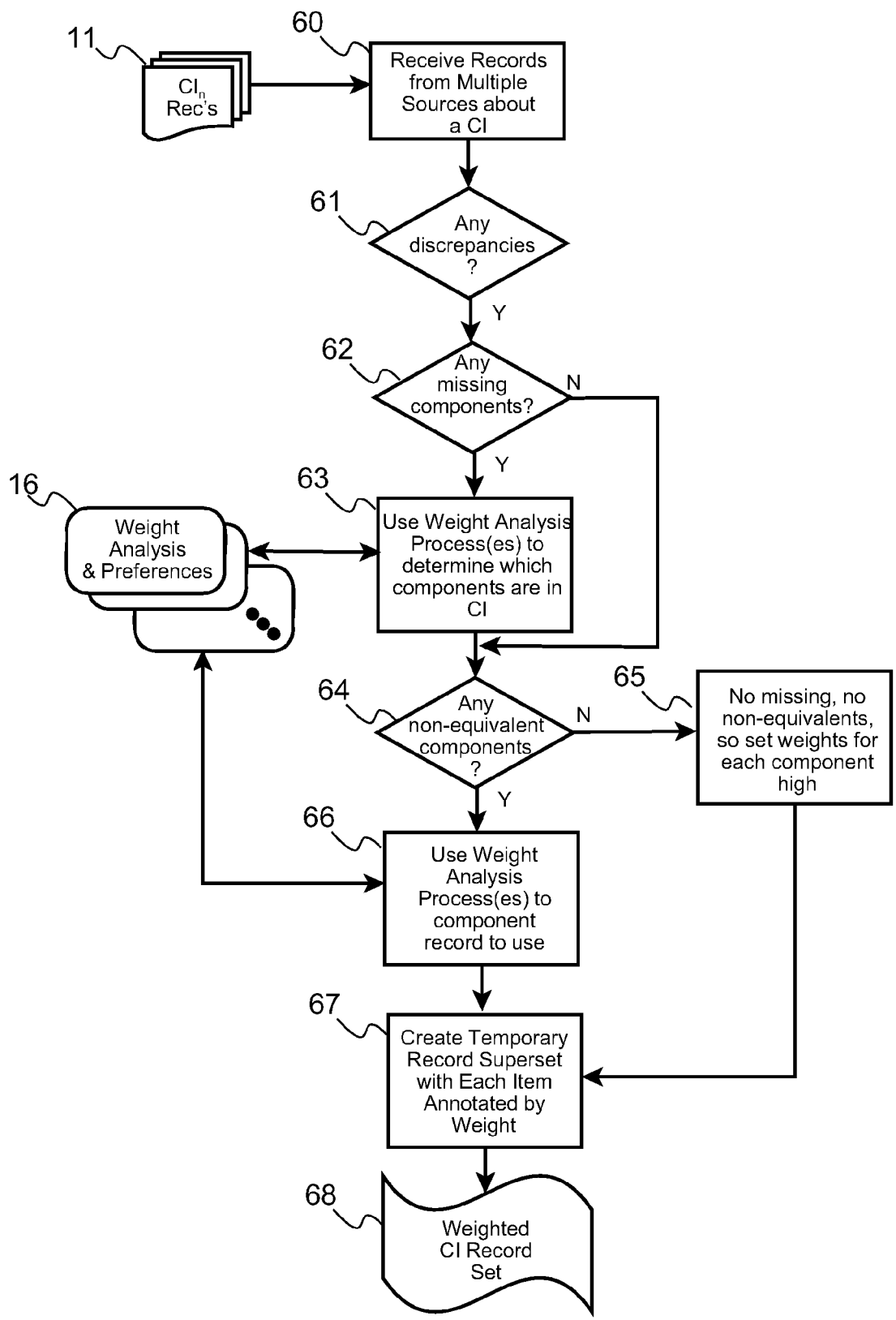
FIG. 6a shows a logical process according to the invention for assigning weights to configurable item record details.

In FIG. 6a, a logical process according to the invention is shown, in which the records for a particular CI (11) from a plurality of sources or configuration management tools are received (60), and searched for discrepancies (61). If any sources show or report features or components that are missing from the reports of other sources (62), then one or more weight analysis processes and preferences (16) are used (63) to determine which items likely or more reliably are installed in the CI. For example, if one source reports that a particular application program was known to be installed in a certain CI as of three years ago, but more recent reports from other sources are missing this item, then it may be determined that the weight of the older report is low. However, a more recent report which shows a feature or component which is not reported by other sources may be given higher weight, for example. In some other cases some point products are considered authoritative sources, meaning that irrespective of what any other point product is reporting, the information reported by the authoritative source is considered accurate.

Also, if any nonequivalent components or features are discovered in records about the CI from different sources (64), then one or more weight analysis processes and preferences (16) are employed (66) to assign weight values to each item in each reported set of records. Nonequivalent, as used here, means that the items may not be reported exactly in the same format, but can be determined using one or more translation tables, thesauri, etc., to represent the same type of item. For example, one report may show an application program 'Lotus WordPro", while another may just show "WordPro 2000". Since "WordPro"™ is a known trademark to Lotus Corporation, then it can be determined that these entries represent the same type of product, but not necessarily the same revision of the product.

If all reported record sets for the particular CI seem to be equivalent (65), then high weight values may be assigned to all components in the CI. Finally, a temporary record superset (68) is preferably created (67), wherein each item for each record set is annotated by the assigned weight value.

Figure 6B:
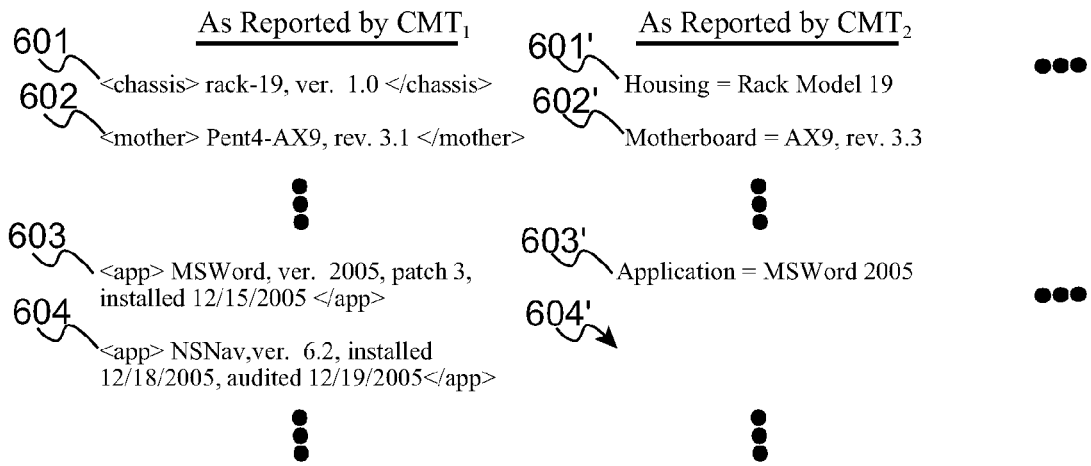
FIGS. 6b and 6c provide examples of configurable item record details, the latter of which is annotated to including weights.
Figure 6C:
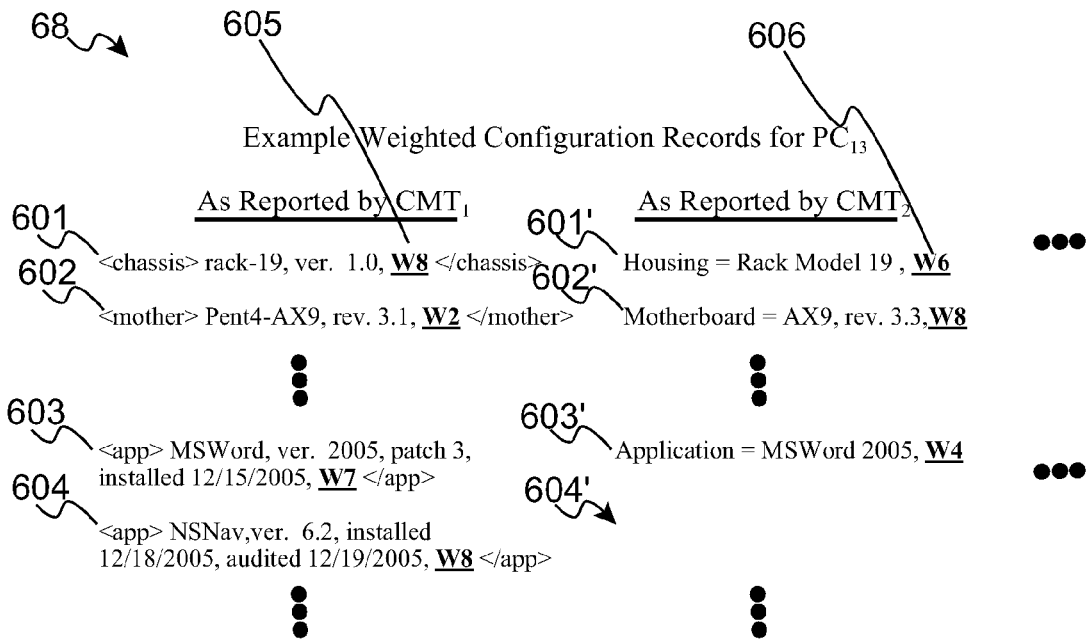

Turning to FIG. 6b, an example of two reported record sets for a hypothetical PC number 13 are shown, one set from a first configuration management tool $CMT_1$, the other from a second configuration management tool $CMT_2$, as well as potentially other record sets from other configuration management tools. In this example, the CI's chassis or housing is reported (601, 601') in two slightly different formats, but otherwise, equivalent, except that one report (601) provides a version indication. The CI's motherboard or mainboard is also reported in both reports, but the revision levels differ. Also, an application MS Word is equivalently reported (603, 603'), although one report (603) shows a date of installation of a patch which is not shown by the other report (603'). Finally, one report shows an install Netscape Navigator™ application program (604), which is missing from the second report (604'). In this relatively simple illustration, four components or details are shown for the same CI, although some level of discrepancy arises in each of the four.

According to a preferred embodiment, weights can automatically be assigned according to a variety of rules and analyses, including but not limited to:

(a) A weight can be adjusted or determined on the basis of a known update or synchronization rate of the source. As in the example of FIG. 1, perhaps the SAP Financial System is known to update hourly, while the TPM and TCM systems are known to update daily or even weekly. As such, the SAP Financial System's reports may be afforded somewhat higher weights in one embodiment.

(b) A weight can be based on reported (or lack of report) of revision level, patch level, and update level of each feature or component, giving greater weight to later or higher revision, patch, and update levels, if appropriate, and giving lower weight to items showing older or earlier revision/update/patch levels, or not showing these levels at all.

(c) A weight can be based on the date of the report, or the date of the most recent update to the report.

(d) A weight can be based on the frequency of access to a report (e.g. how often it has been read or written in a past period of time).

(e) A high weight value can be based on a designation of a report or item in a report as being an authoritative source.

(f) A weight value can be based on the results of examining and parsing history logs, installation logs, release notes, etc., which may yield information corroborating one or more details of one or more reports.

(g) Weight can be assigned based on whether the point product is considered an authoritative source or not (e.g.

designation of a point product which is matured in the organization for which the information is trusted).

To follow our example of FIG. 6b, an example weight-annotated set of configuration records (68) are shown in which weights have been added to each record detail. For example, the chassis report from the first CMT is given higher weight (605) than the weight (606) for the chassis report from the second CMT because a version number is provided in the first report. Likewise, a higher weight is given to the motherboard report from the second CMT than from the first CMT because the second report shows a later revision level, probably indicating an upgraded motherboard.

Confidence Factor Generation

Figure 7A:
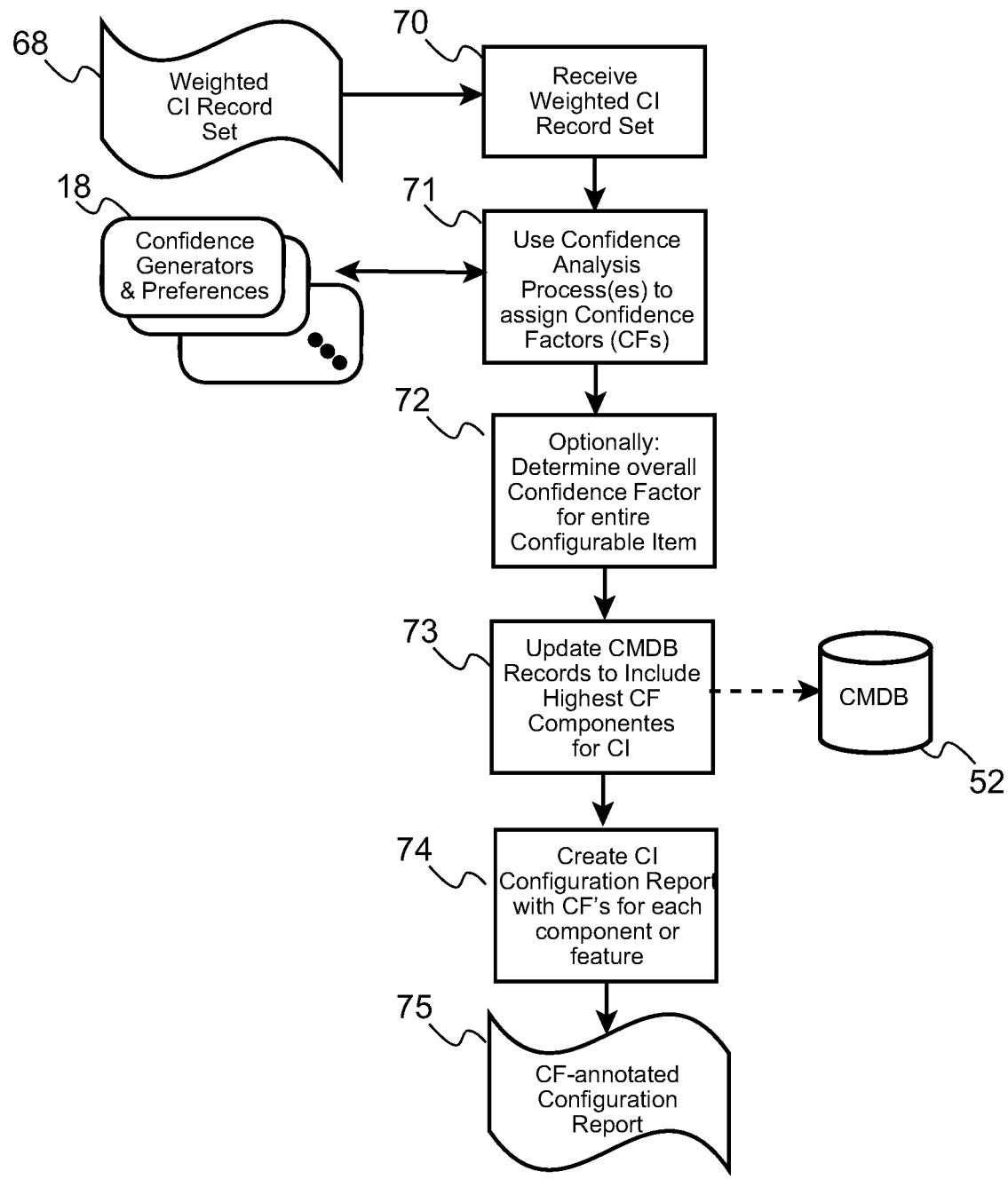
FIG. 7a shows a logical process according to the invention for determining a confidence factor based upon weighted configuration item details.

Turning to FIG. 7a, a logical process according to the present invention for generating the Confidence Factors ("CF") is shown. The weighted CI record set (68) is received or accessed (70), and one or more confidence factor generator processes and preferences (18) are employed to select a most reliable or trustworthy item among equivalent items in the multiple reports based upon the weights on those items and the weight differences between them. For example, the weight differences between the chassis reports (601, 601') are not great, so the highest weighted report would be used, and would be given a high CF. As such, a single list or report of options, components, and features is created for the CI by selecting the highest rated items from the weighted reports, and then by annotating that single report with confidence factors for each option, component and feature.

Further, optionally, an overall CF for the configurable item as a unit is determined (72) based upon the aggregation, average, or other calculation, of all of the confidence factors of all the constituent options, components, and features of the CI.

Next, the CMDB records (52) are updated (73) to reflect this consolidated list of options, components, and features, preferably including the confidence factors for each item and for the CI as a unit. Also, according to one available embodiment, a human-readable report (75), such as a paper printout or a report displayable on a computer screen, is created (74) including the consolidated list of options, components, and features, preferably including the confidence factors.

FIG. 7b illustrates an example annotated consolidated list (75) based upon the examples of FIGS. 6a and 6b, in which confidence factors (700, 701) are included with the selected options, components, and features listed in the report (75).

Some Example CIs

For greater understanding of the application of this invention, we now present some general information about some common configurable items ("CIs"). The following is not intended to be an exhaustive list, whereas there are a wide variety of configurable systems which may be managed by configuration management tools.

Storage Area Network.

A Storage Area Network ("SAN") is typically a network designed to connect computer storage devices such as tape libraries and disk array controllers to servers. In other words, it is a high-speed special-purpose network that interconnects different data storage devices with each other. There are two variations of SAN. First, SAN can be a network whose primary purpose is to provide data transfer between computer systems and storage elements. Second, SAN can be a storage system composed of storage elements, devices, computer systems, appliances including control software communicating over a network. SAN differs from other forms of network storage like network attached storage ("NAS") because it uses low-level access methods. This means that SAN uses a method called block storage, which when the server issues a request, it is meant for specified blocks or data segments from a disk drive. SAN storage is a one-to-one relationship. In other words, each device of Logical Unit Number ("LUN") on the SAN is owned by a single computer to access the same set of files over a network. Contrarily, NAS enables multiple computers to access the same set of files over a network. One of the many benefits of SAN is its ability to allow servers to boot from the SAN itself. This enables a quicker and easier method to replace faulty servers since SAN can be reconfigured so that a replacement server can use the LUN of the faulty server. In addition, SAN can provide increase in storage capacity utilization because multiple servers can share the same growth reserve. With improvement in technology, it is now possible to incorporate subnetworks with NAS systems.

Network Attached Storage.

A Network Attached Storage ("NAS") is typically a hard disk storage arrangement with its own network address rather than attached to a department computer that is servicing applications to a network's workstation users. It includes multi-disk Redundant Array of Independent Disks ("RAID") which allows storing the same data in different places on multiple hard disks. A NAS storage element can be made-up of an engine that implements the file services and one or more devices which data is stored. By using NAS, it allows multiple computers to share the same storage space at once which reduces the amount of overhead required and allow information to be accessed faster since there is no competition for same processor resources. NAS uses file based protocols such as Microsoft's™ Internetwork Packet Exchange and NetWEUI, Novell's Netware Internetwork Packet Exchange™, Sun Microsystem's™ Network File System, Server Message Block ["SMB"] which was later named Common Internet File System ["CIFS"]. Between NAS and SAN, NAS is a logical choice for local file system storage in a local area network ("LAN"). Therefore, much of NAS relies heavily on cached memory for performance. NAS provide many advantages such as the ability to deliver with significant ease in usage, provide heterogeneous data sharing and allow organizations to automate and simplify data management.

Personal Computers.

A Personal Computer ("PC") is typically a microcomputer designed to be used by one person at a time. It is usually use for general purpose work such as word processing, programming, sending messages or digital documents. In the modern usage, PC refers to an IBM PC compatible because it utilizes the basic framework designed originally by IBM. There are several types of computers such as desktop, laptop, personal digital assistants ("PDA"), portable, and tablet computers. Generally, a motherboard, central processing unit, memory, hard disk drive and graphic card are the basic components that make-up a computer. PCs are the point of contact users use to access data via a network whether it is SAN or NAS.

Servers.

A Server is typically a software application that carries out tasks on behalf of a client such as a PC. Using the Internet as an example, a server can be an APACHE web server that runs functions initiated by browsers such as Internet Explorer, a Web client, to access HTML pages or files. Client-server relationship also exits for services involving electronic messaging, remote login, and graphical output displays. This is using file serving, which users store and access information on a PC, and an application server that runs various programs to carry out a specified task for the users. In general, a server describes a machine that have high-capacity power supplies, a motherboard built for durability in a round-the-clock operation, large quantities of error-correcting code, random access memory ("RAM"), and fast input/output ("I/O"). Servers utilize both SAN and NAS for accessibility between machines. Some examples of servers are mail, FTP, news, peer-to-peer, image, instant-messaging, and dedicated servers.

Routers.

A router is typically a network device that forwards data packet across a network toward destinations through a process called routing. Routing occurs on layer three, known as Network Layer, of the Open Systems Interconnection ("OSI") seven layers model. A router acts as a connector between two networks in order for data transfer. Typically, routers are often confused with switches. A simple illustration to distinguish one from another is that switches are like neighborhood streets, while routers are the intersections with street signs. Routers connect networks together so packets know where it needs to flow. There are several types of routers. An edge router is a router that connects clients to the Internet. A core router is one whose sole purpose is transmitting data between routers inside a network. With ease in technology, routers are used even in homes and small offices setup a small network. These routers provide a wide range of services such as Dynamic Host Configuration Protocol ("DHCP"), Network Address Translation ("NAT"), Demilitarized Zone ("DMZ"), Firewall, content filtering and Virtual Private Network ("VPN").

Suitable Computing Platform

In one embodiment of the invention, including the previously described logical processes, are performed partially or entirely by executing software on a computer, such as a personal computer, a web server, a web browser, or even an appropriately capable portable computing platform, such as a personal digital assistant ("PDA"), a web-enabled wireless telephone, or another type of personal information management ("PIM") device.

Therefore, it is useful to review a generalized architecture of a computing platform which may span the range of implementation, from a high-end web or enterprise server platform, to a personal computer, to a portable PDA or web-enabled wireless phone.

Figure 2A:
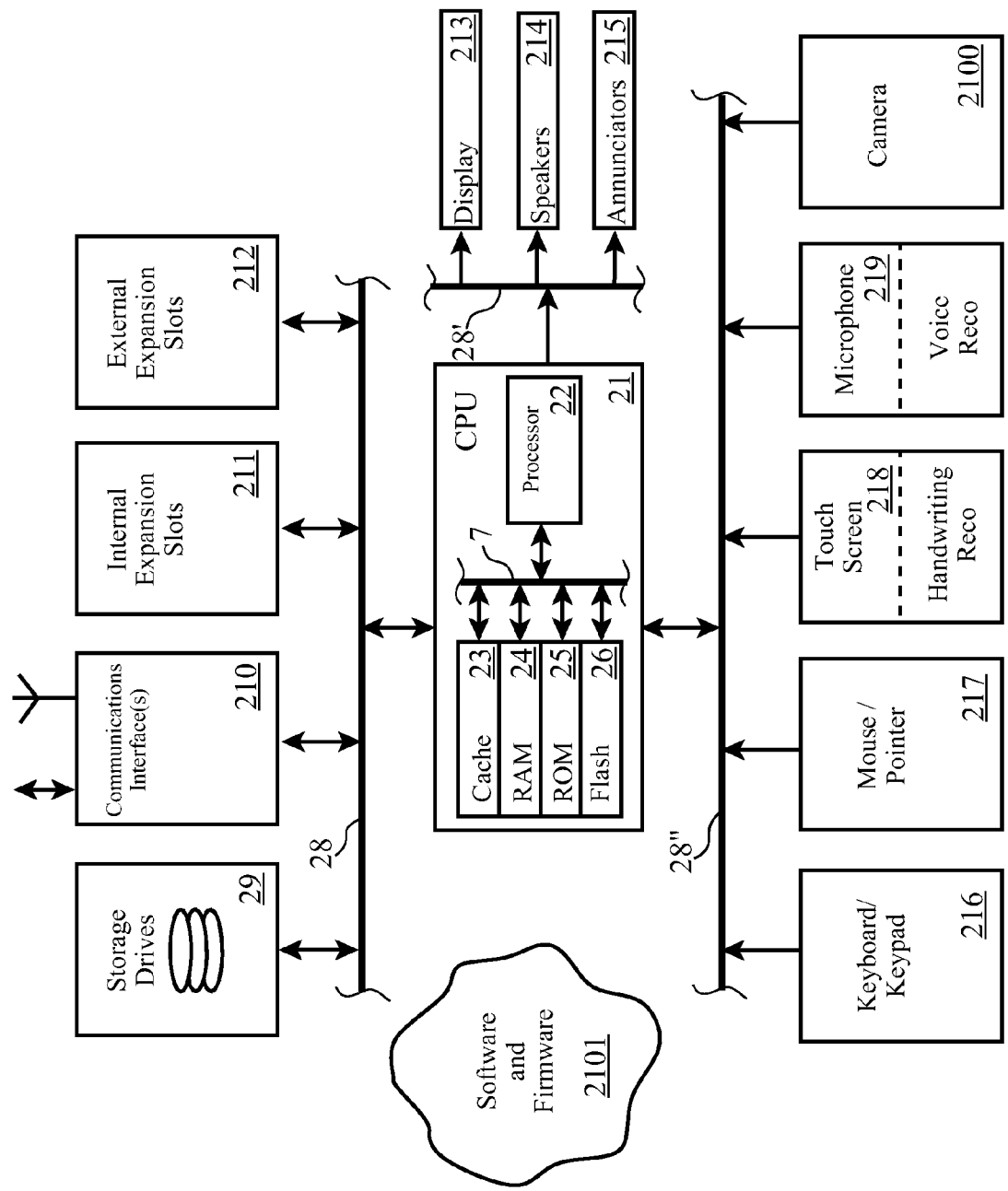
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
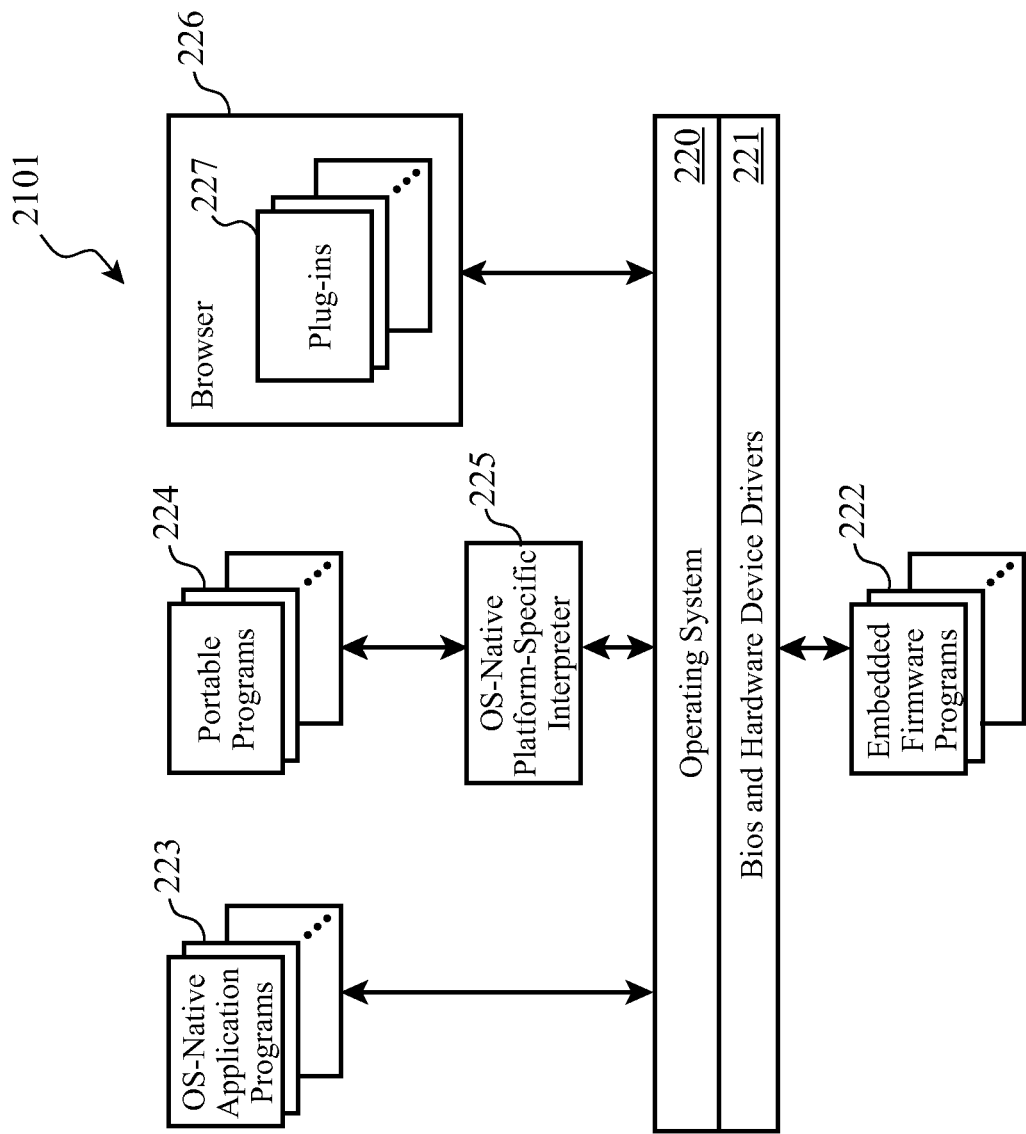

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as realtime operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Service-Based Embodiments

Alternative embodiments of the present invention include of some or all of the foregoing logical processes and functions of the invention being provided by configuring software, deploying software, downloading software, distributing software, or remotely serving clients in an on-demand environment. For example, some or all of logical processes for collecting multiple configuration reports about a CI from multiple sources, for analyzing the configurable elements in each report and assigning weights to each element, and for producing a new configuration report for a CI including a confidence factor, can be provided as an online, on-demand service accessible remotely by other CMDB products. Alternatively, one or more of these logical processes could be downloaded on-demand for execution by a client, or could be dynamically configured on-demand in a grid computing environment in order to handle an instant need for such processing. In another embodiment, one or more of the collection, weight assignment, and confidence factor generating logical processes can be integrated into a computing environment, as a cooperative program, a library function, or an integral portion of another program.

Software Deployment Embodiment.

According to one embodiment of the invention, the methods and processes of the invention are distributed or deployed as a service to by a service provider to a client's computing system(s).

Figure 3A:
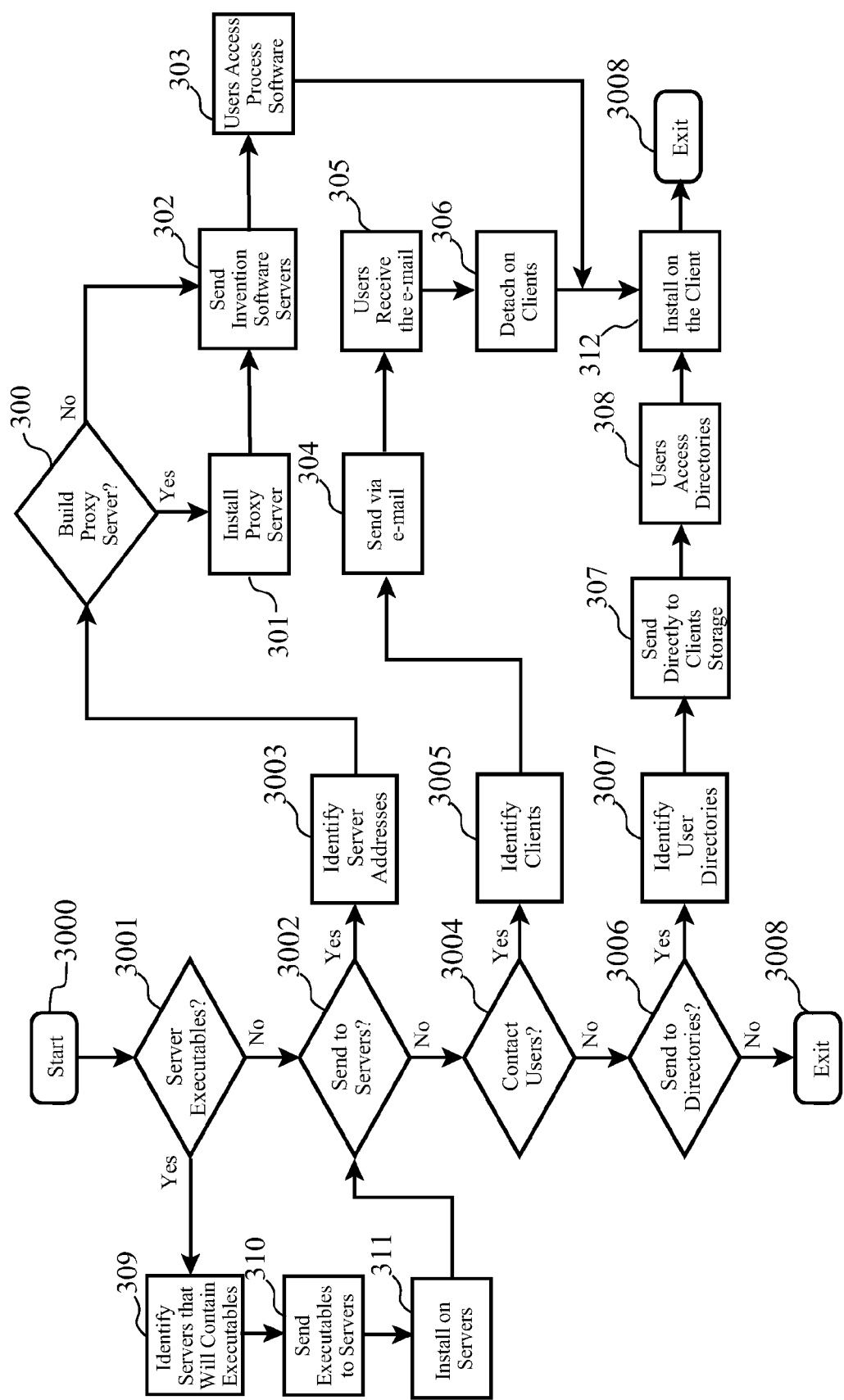
FIG. 3a sets forth a logical process to deploy software to a client in which the deployed software embodies the methods and processes of the present invention.

Turning to FIG. 3a, the deployment process begins (3000) by determining (3001) if there are any programs that will reside on a server or servers when the process software is executed. If this is the case then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it is copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as but not limited to sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment.

According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
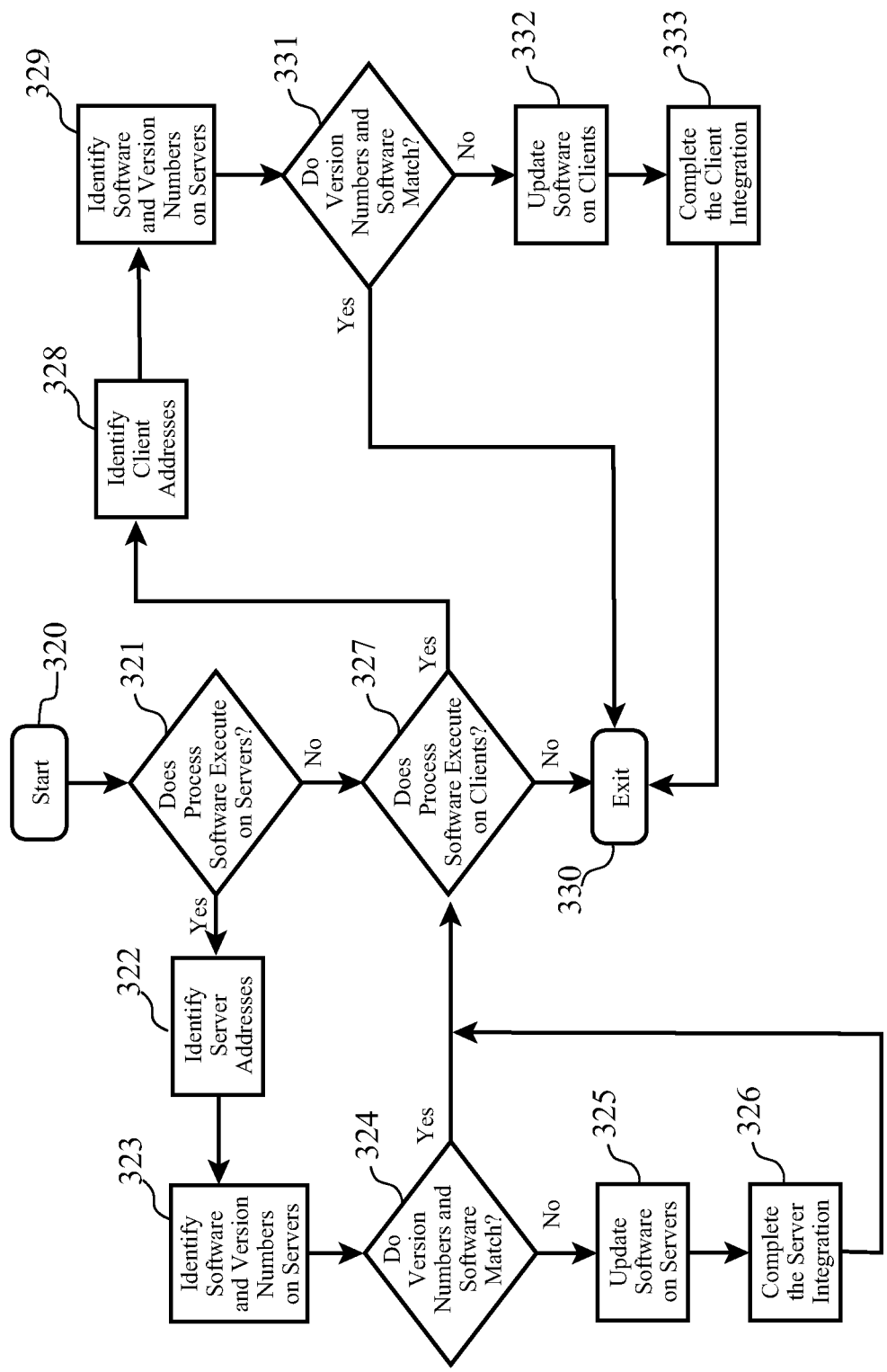
FIG. 3b sets for a logical process to integrate software to other software programs in which the integrated software embodies the methods and processes of the present invention.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match and there is no missing required software the integration continues in (327).

If one or more of the version numbers do not match, then the unmatched versions are updated on the server or servers with the correct versions (325). Additionally if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

On-Demand Computing Services Embodiment.

According to another aspect of the present invention, the processes and methods disclosed herein are provided through an on-demand computing architecture to render service to a client by a service provider.

Figure 3C:
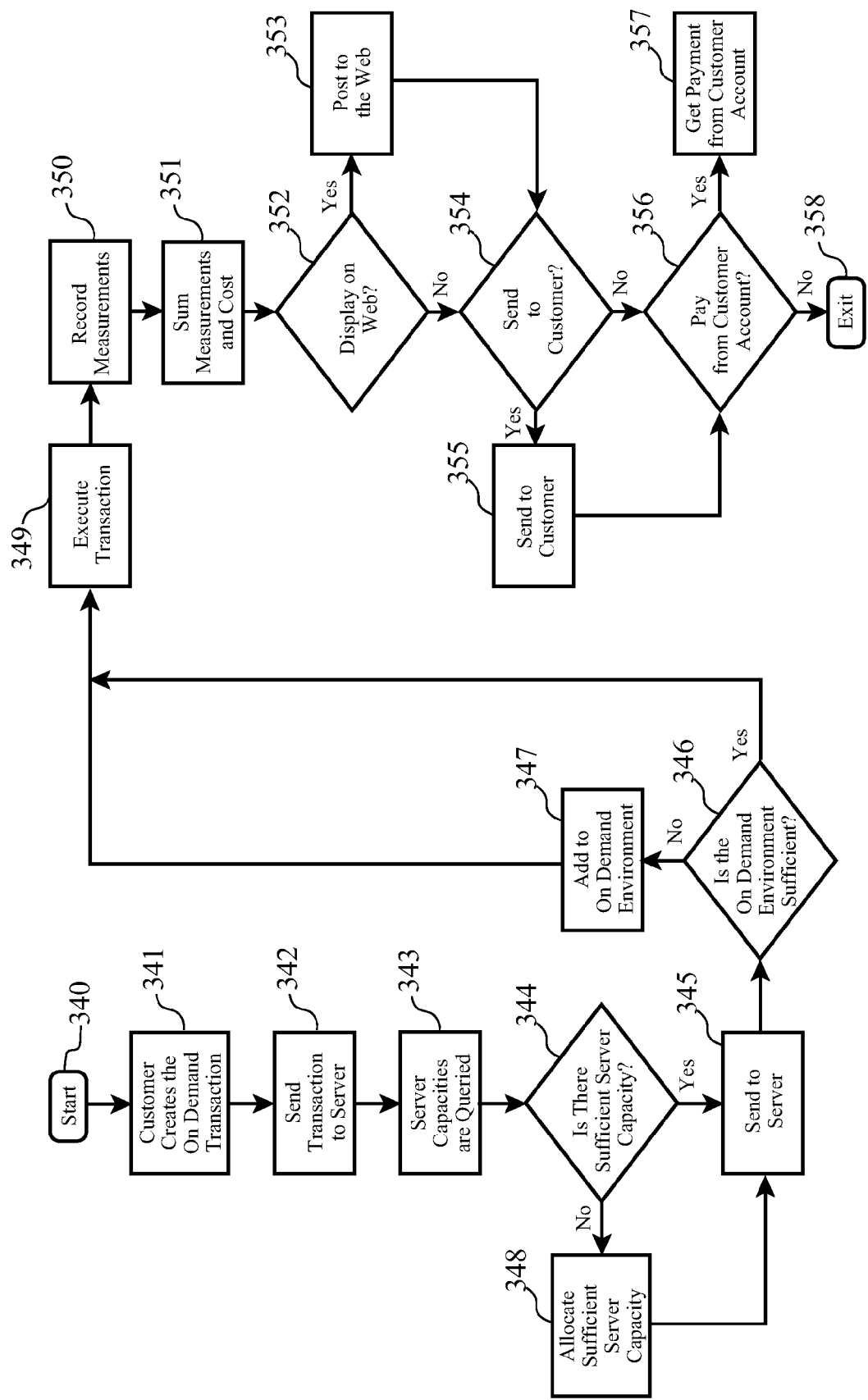
FIG. 3c sets for a logical process to execute software on behalf of a client in an on-demand computing system, in which the executed software embodies the methods and processes of the present invention.

Turning to FIG. 3c, generally speaking, the process software embodying the methods disclosed herein is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On-Demand process. A transaction is created that contains the unique customer identification, the requested service type and any service parameters that further specify the type of service (341). The transaction is then sent to the main server (342). In an On Demand environment the main server can initially be the only server, then as capacity is consumed other servers are added to the On Demand environment.

The server central processing unit ("CPU") capacities in the On Demand environment are queried (343). The CPU requirement of the transaction is estimated, then the servers available CPU capacity in the On Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity then the transaction is sent to a selected server (345).

Before executing the transaction, a check is made of the remaining On Demand environment to determine if the environment has sufficient available capacity for processing the transaction. This environment capacity consists of such things as but not limited to network bandwidth, processor memory, storage etc. (345). If there is not sufficient available capacity, then capacity will be added to the On Demand environment (347). Next the required software to process the transaction is accessed, loaded into memory, then the transaction is executed (349).

The usage measurements are recorded (350). The usage measurements consists of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On Demand costs be posted to a web site (352) then they are posted (353). If the customer has requested that the On Demand costs be sent via e-mail to a customer address (354) then they are sent (355). If the customer has requested that the On Demand costs be paid directly from a customer account (356) then payment is received directly from the customer account (357). The last step is to exit the On Demand process.

VPN Deployment Embodiment.

According to another aspect of the present invention, the methods and processes described herein may be embodied in part or in entirety in software which can be deployed to third parties as part of a service, wherein a third party VPN service is offered as a secure deployment vehicle or wherein a VPN is build on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
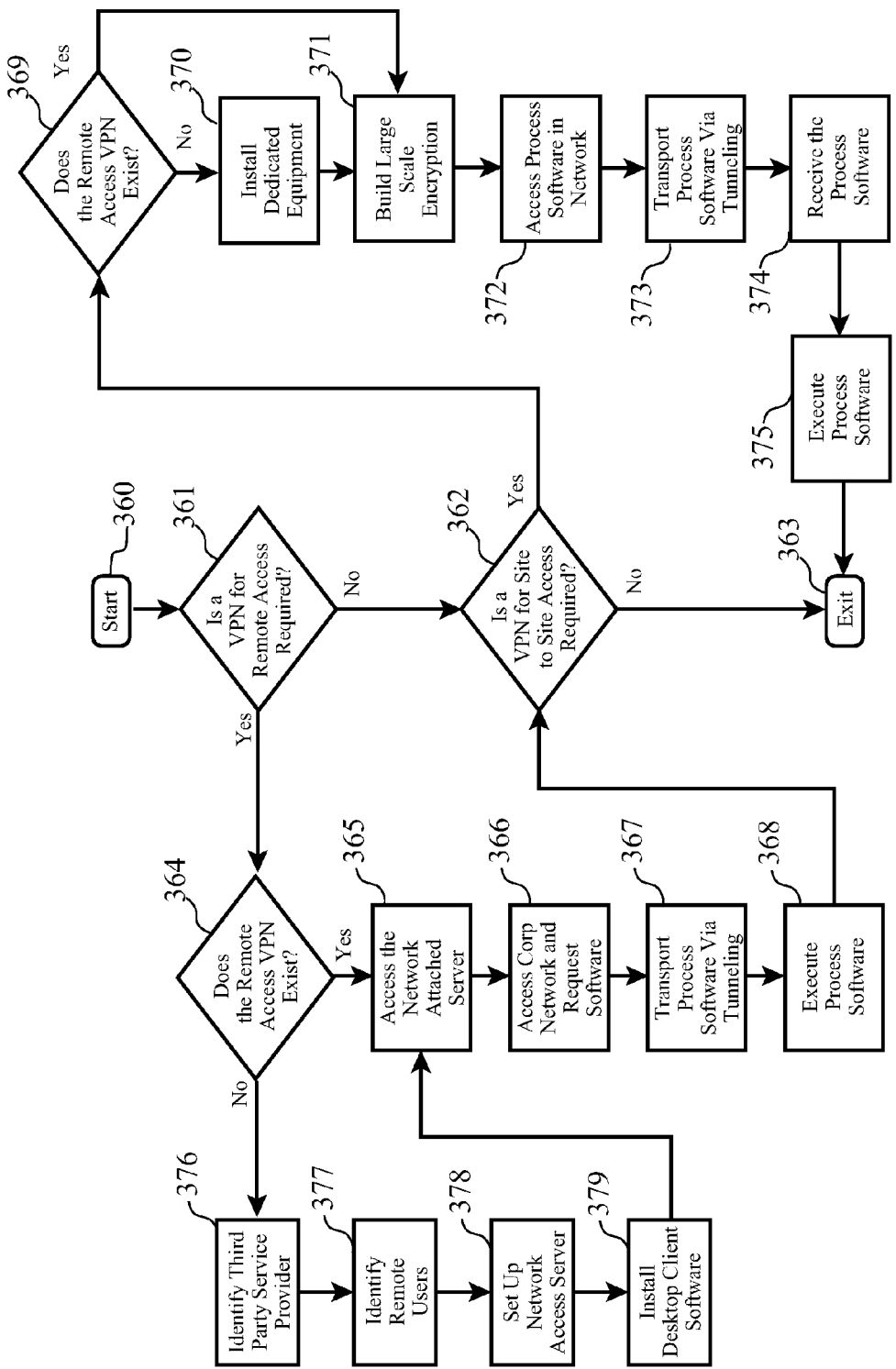
FIG. 3d sets for a logical process to deploy software to a client via a virtual private network, in which the deployed software embodies the methods and processes of the present invention.

Turning to FIG. 3d, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

Computer-Readable Media Embodiments

In another embodiment of the invention, one or more logical processes according to the invention and described herein, such as the configuration report gathering process, the configurable element weight assignment process, and the confidence factor generating process are encoded on or in one or more computer-readable media. Some computer-readable media are read-only (e.g. they must be initially programmed using a different device than that which is ultimately used to read the data from the media), some are write-only (e.g. from a the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 4A:
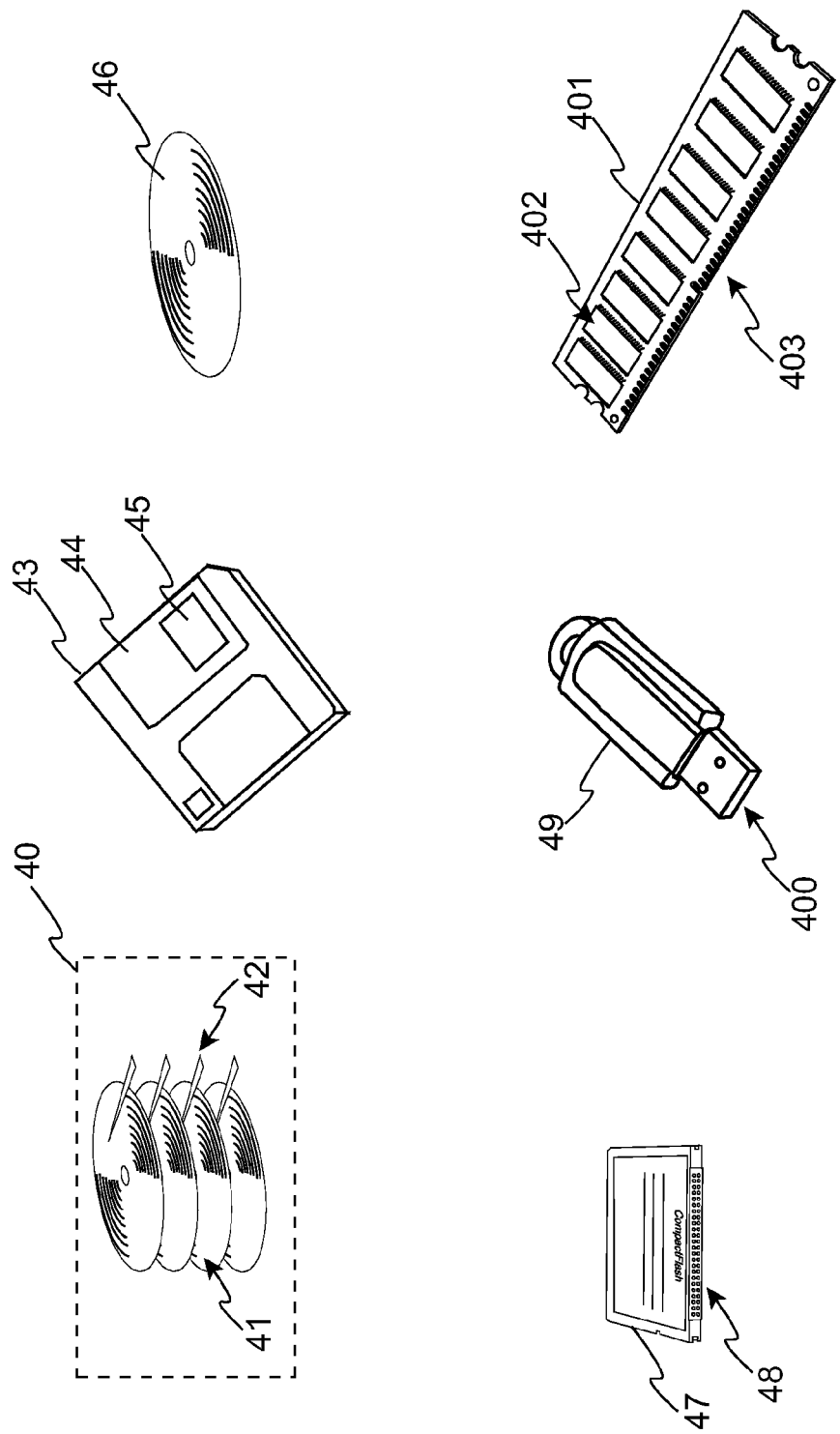
FIGS. 4a, 4b and 4c, illustrate computer readable media of various removable and fixed types, signal transceivers, and parallel-to-serial-to-parallel signal circuits.

FIG. 4a illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick™, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
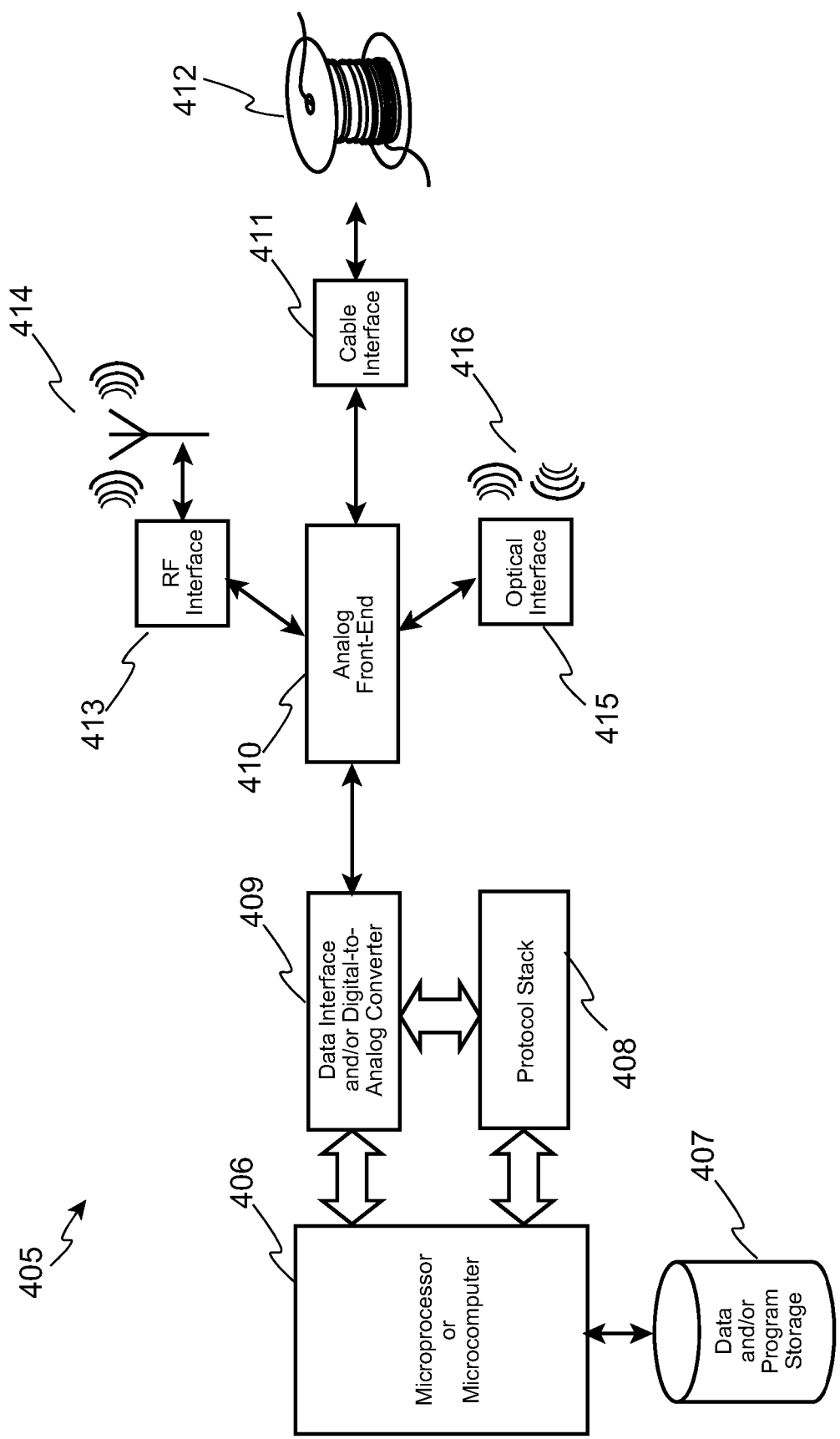

Turning now to FIG. 4b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as Infrared Data Arrangement ("IrDA"). The system of FIG. 4b may also be realized in another manner to serve as a data transmitter, data receiver, or data transceiver for a USB system, such as a drive to read the aforementioned USB FlashDrive, or to access the serially-stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-periperal embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electro-magnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 4C:
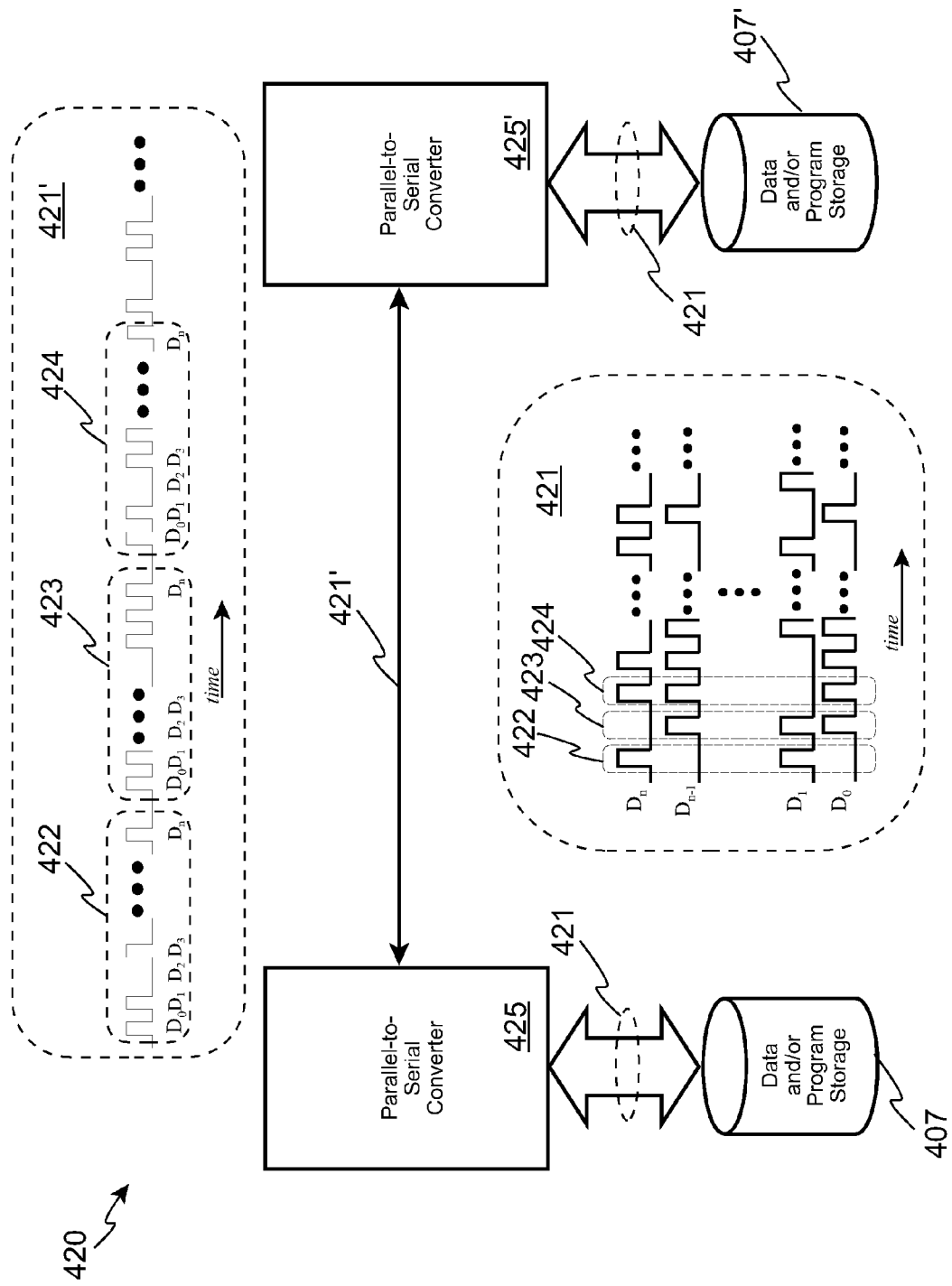

FIG. 4c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as an RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$-$D_n$ being on a bus or signal carrier simultaneously, where the "width" of the data unit is n−1. In some systems, $D_0$ is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or FireWire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

CONCLUSION

While certain examples and details of a preferred embodiment have been disclosed, it will be recognized by those skilled in the are that variations in implementation such as use of different programming methodologies, computing platforms, and processing technologies, may be adopted without departing from the spirit and scope of the present invention. Therefore, the scope of the invention should be determined by the following claims.

What is claimed is:

1. A method for resolving conflicting details in configuration reports comprising:
   receiving by a computer a plurality of configuration reports, the received reports reflecting configuration states or configuration state changes about a single configurable item, the configurable item having a plurality of reported configurable elements, the configuration reports being received from a plurality of different sources and being of unknown correctness regarding actual states of the single configurable item and its one or more installed elements;
   assigning by a computer a weight value to each reported single configurable element which conflicts with another reported single configurable element in the configuration reports using one or more computer-based weighting rules, wherein the rules comprise a determination of a likelihood of correctness of each conflicting reported element actually being present and enabled in the configurable item, and wherein the conflict comprises at least one element detail selected from the group consisting of revision level, version level, patch level, capacity, license status, age, percentage of capacity used, percentage of capacity unused, installation date, and removal date, and excluding operational fault status;
   resolving by a computer each conflict by selecting by a computer only one of each of the conflicting elements having greater assigned likelihood of correctness weight values and preferences; and
   creating by a computer a new configuration report for the selected single configurable item by producing a report containing only the single selected configurable elements having the greater likelihood of being present and enabled in the configurable item, and omitting non-selected configurable elements.

2. The method as set forth in claim 1 further comprising generating a configurable item unit-level confidence factor based upon said confidence factors of said configurable elements.

3. The method as set forth in claim 2 further comprising employing said unit-level confidence factor in a regulated process control such that said regulated process is inhibited for configurable items having unit-level confidence levels below a threshold value.

4. The method as set forth in claim 1 wherein said employing one or more weighting rules and preferences to assign a weight value comprises determining a weight on a basis of a known update or synchronization rate of a source of a report.

5. The method as set forth in claim 1 wherein employing one or more weighting rules and preferences to assign a weight value comprises determining a weight on a basis of a date of a report or a date of a most recent update to the report.

6. The method as set forth in claim 1 wherein employing one or more weighting rules and preferences to assign a weight value comprises determining a weight on a basis of a frequency of access to a report.

7. The method as set forth in claim 1 wherein employing one or more weighting rules and preferences to assign a weight value comprises determining a weight on a basis of a designation of a report or item in a report as being an authoritative source.

8. The method as set forth in claim 1 wherein employing one or more weighting rules and preferences to assign a weight value comprises determining a weight on a basis of results of examining and parsing installation and removal history logs to yield information corroborating one or more details of one or more reports.

9. The method as set forth in claim 1 further comprising producing a human-readable report including said new data set for said configurable item and said confidence factors for each configurable element.

10. The method as set forth claim 9 wherein said human-readable report is employed in a regulated process to perform a function selected from the group consisting of accurately communicating an information system environment to a system administrator, complying with a regulation, and thwarting a security threat.

11. The method as set forth in claim 1 further comprising maintaining an integrity index for a configuration management database in part based upon said confidence factors, thereby providing an indicator of trustworthiness for said configuration management database.

12. A computer program product for resolving conflicting details in configuration reports comprising:
one or more computer readable memory devices suitable for encoding software programs; and
one or more computer instructions encoded by the one or more computer readable memory devices for causing a processor to:
receive a plurality of configuration reports, the configuration reports reflecting configuration states or configuration state changes about a single configurable item, the configurable item having a plurality of reported configurable elements, the configuration reports being received from a plurality of different sources and being of unknown correctness regarding actual states of said single configurable item and its one or more installed elements;
assign a weight value to each reported single configurable element which conflicts with another reported single configurable element in the configuration reports using one or more computer-based weighting rules, wherein the rules comprise a determination of a likelihood of correctness of each conflicting reported element actually being present and enabled in the configurable item, and wherein the conflict comprises at least one element detail selected from the group consisting of revision level, version level, patch level, capacity, license status, age, percentage of capacity used, percentage of capacity unused, installation date, and removal date, and excluding operational fault status;
resolve each conflict by selecting only one of each of the conflicting elements having greater assigned likelihood of correctness weight values and preferences; and
create a new configuration report for the selected single configurable item by producing a report containing only the single selected configurable elements having the greater likelihood of being present and enabled in the configurable item, and omitting non-selected configurable elements.

13. The computer program product as set forth in claim 12 further comprising program instructions encoded by the computer readable memory device for generating a configurable item unit-level confidence factor based upon said confidence factors of said configurable elements.

14. The computer program product as set forth in claim 13 further comprising program instructions encoded by the computer readable memory device for employing the unit-level confidence factor in a regulated process control such that the regulated process is inhibited for configurable items having unit-level confidence levels below a threshold value.

15. The computer program product as set forth in claim 12 wherein employing one or more weighting rules and preferences to assign a weight value comprises determining a weight on a basis of a known update or synchronization rate of a source of a report.

16. The computer program product as set forth in claim 12 wherein employing one or more weighting rules and preferences to assign a weight value comprises determining a weight on a basis of a date of a report or a date of a most recent update to the report.

17. The computer program product as set forth in claim 12 wherein employing one or more weighting rules and preferences to assign a weight value comprises determining a weight on a basis of a frequency of access to a report.

18. The computer program product as set forth in claim 12 wherein employing one or more weighting rules and preferences to assign a weight value comprises determining a weight on a basis of a designation of a report or item in a report as being an authoritative source.

19. The computer program product as set forth in claim 12 wherein employing one or more weighting rules and preferences to assign a weight value comprises determining a weight on a basis of results of examining and parsing installation and removal history logs to yield information corroborating one or more details of one or more reports.

20. The computer program product as set forth in claim 12 further comprising program instructions encoded by the computer readable memory device for producing a human-readable report including said new data set for the configurable item and the confidence factors for each configurable element.

21. The computer program product as set forth in claim 20 wherein the human-readable report is employed in a regulated process to perform a function selected from the group consisting of accurately communicating an information system environment to a system administrator, complying with a regulation, and thwarting a security threat.

22. The computer program product as set forth in claim 12 further comprising program instructions encoded by the computer readable memory device for maintaining an integrity index for a configuration management database in part based upon the confidence factors, thereby providing an indicator of trustworthiness for the configuration management database.

23. A system for resolving conflicting details in configuration reports comprising:
a computing platform having a processor;
a receiver portion of the computing platform for receiving a plurality of configuration reports, the received reports reflecting configuration states or configuration state changes about a single configurable item, the configurable item having a plurality of reported configurable elements, the configuration reports being received from a plurality of different sources and being of unknown correctness regarding actual states of the single configurable and its one or more installed configurable elements;
a weight assigner portion of the computing platform for assigning a weight value to each reported single configurable element which conflicts with another reported single configurable element in the received configuration using one or more computer-based weighting rules, wherein the rules comprise a determination of a likelihood of correctness of each conflicting reported element actually being present and enabled in the configurable item, and wherein the conflict comprises at least one element detail selected from the group consisting of revision level, version level, patch level, capacity, license status, age, percentage of capacity used, percentage of capacity unused, installation date, and removal date, and excluding operational fault status;

a resolver portion of the computing system for resolving each conflict by selecting only one of each of the conflicting elements having greater assigned likelihood of correctness weight values and preferences; and a report creator portion of the computing platform for creating a new configuration report for the selected single configurable item by producing a report containing only the selected configurable elements having the greater likelihood of being present and enabled in the configurable item and omitting non-selected configurable elements.

24. The system as set forth in claim 4 further wherein said evaluator generates a configurable item unit-level confidence factor based upon said confidence factors of said configurable elements.

25. The system as set forth in claim 24 wherein said unit-level confidence factor is employed in a regulated process control such that said regulated process is inhibited for configurable items having unit-level confidence levels below a threshold value.

26. The system as set forth in claim 23 wherein employing one or more weighting rules and preferences to assign a weight value comprises determining a weight on a basis of a known update or synchronization rate of a source of a report.

27. The system as set forth in claim 23 wherein employing one or more weighting rules and preferences to assign a weight value comprises determining a weight on a basis of a date of a report or a date of a most recent update to the report.

28. The system as set forth in claim 23 wherein employing one or more weighting rules and preferences to assign a weight value comprises determining a weight on a basis of a frequency of access to a report.

29. The system as set forth in claim 23 wherein employing one or more weighting rules and preferences to assign a weight value comprises determining a weight on a basis of a designation of a report or item in a report as being an authoritative source.

30. The system as set forth in claim 23 wherein employing one or more weighting rules and preferences to assign a weight value comprises determining a weight on a basis of results of examining and parsing installation and removal history logs to yield information corroborating one or more details of one or more reports.

31. The system as set forth in claim 23 further comprising a report generator producing a human-readable report including said new data set for said configurable item and said confidence factors for each configurable element.

32. The system as set forth in claim 31 wherein said human-readable report is employed in a regulated process to perform a function selected from the group consisting of accurately communicating an information system environment to a system administrator, complying with a regulation, and thwarting a security threat.

33. The system as set forth in claim 23 said updater maintains an integrity index for a configuration management database in part based upon said confidence factors, thereby providing an indicator of trustworthiness for said configuration management database.

* * * * *